US007308462B1

(12) United States Patent
Clarkson et al.

(10) Patent No.: US 7,308,462 B1
(45) Date of Patent: Dec. 11, 2007

(54) METHODS AND SYSTEMS FOR BUILDING AND DISTRIBUTING AUDIO PACKAGES

(75) Inventors: Laurence Wayne Clarkson, Wake Forest, NC (US); Jeffrey Dean Lanning, Cary, NC (US); Melissa Ann Metts, Raleigh, NC (US); Xiaofeng Gao, Alpharetta, GA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/431,566

(22) Filed: Oct. 29, 1999

(51) Int. Cl.
*G06F 17/30* (2006.01)

(52) U.S. Cl. .............. 707/104.1; 707/100; 707/103 R; 379/67.1; 379/88.01; 370/218; 370/351; 370/352; 709/201; 709/203

(58) Field of Classification Search ............... 707/10, 707/104.1, 103 R, 100; 379/67.1, 88.01; 370/218, 351, 352; 709/201, 203
See application file for complete search history.

(56) References Cited

U.S. PATENT DOCUMENTS

| 5,434,910 | A | | 7/1995 | Johnson et al. ............... 379/89 |
|---|---|---|---|---|
| 5,511,112 | A | | 4/1996 | Szlam ........................ 379/88 |
| 5,530,950 | A | | 6/1996 | Medan et al. ................. 379/67 |
| 5,539,808 | A | * | 7/1996 | Inniss et al. ............... 379/88.22 |
| 5,652,785 | A | | 7/1997 | Richardson, Jr. et al. ..... 379/88 |
| 5,661,787 | A | | 8/1997 | Pocock .................. 379/101.01 |
| 5,732,216 | A | | 3/1998 | Logan et al. .......... 395/200.33 |
| 5,793,980 | A | | 8/1998 | Glaser et al. .......... 395/200.61 |
| 5,883,940 | A | | 3/1999 | Thornton ................... 379/88.2 |
| 5,884,262 | A | | 3/1999 | Wise et al. ................. 704/270 |
| 5,918,213 | A | | 6/1999 | Bernard et al. ............... 705/26 |
| 5,978,855 | A | | 11/1999 | Metz et al. ................. 709/249 |
| 6,014,427 | A | | 1/2000 | Hanson et al. ............. 379/67.1 |
| 6,064,673 | A | * | 5/2000 | Anderson et al. ........... 370/389 |
| 6,085,160 | A | | 7/2000 | D'hoore et al. ............. 704/256 |
| RE37,131 | E | | 4/2001 | Mankovitz ................... 455/66 |
| 6,212,527 | B1 | * | 4/2001 | Gustman .................... 707/102 |
| 6,240,448 | B1 | | 5/2001 | Imielinski et al. .......... 709/218 |
| 6,249,784 | B1 | * | 6/2001 | Macke et al. .................. 707/3 |
| 6,279,041 | B1 | * | 8/2001 | Baber et al. ................ 709/232 |

(Continued)

FOREIGN PATENT DOCUMENTS

| WO | WO97/40611 | 10/1997 |
|---|---|---|
| WO | WO98/59486 | 12/1998 |

OTHER PUBLICATIONS

Microsoft Corporation, Microsoft Press Computer Dictionary Third Edition, copyright 1997, p. 247.*

(Continued)

*Primary Examiner*—Hung Q Pham
(74) *Attorney, Agent, or Firm*—Withrow & Terranova, PLLC

(57) ABSTRACT

Methods and systems for building and distributing audio packages include a database storing audio files to be played to end users in a telecommunications network. An audio package builder/export tool generates audio packages including audio segments files and index files. Audio segments files include audio segments to be played by gateways in the telecommunications network. Index files include information used by gateways to located audio segments in audio segments files. The audio packages are distributed to gateways in the telecommunications network to enable the gateways to play audio to end users.

22 Claims, 14 Drawing Sheets

U.S. PATENT DOCUMENTS

| | | | |
|---|---|---|---|
| 6,327,343 B1 | 12/2001 | Epstein et al. | 379/88.01 |
| 6,353,831 B1* | 3/2002 | Gustman | 707/103 R |
| 6,404,746 B1 | 6/2002 | Cave et al. | 370/262 |
| 6,434,140 B1 | 8/2002 | Barany et al. | 370/352 |
| 6,434,520 B1* | 8/2002 | Kanevsky et al. | 704/243 |
| 6,442,335 B1 | 8/2002 | Cookson et al. | 386/97 |
| 6,445,697 B1* | 9/2002 | Fenton | 370/357 |
| 6,477,704 B1 | 11/2002 | Cremia | 725/35 |
| 6,529,584 B1 | 3/2003 | Ravago et al. | 379/67.1 |
| 6,567,399 B1 | 5/2003 | Schuster et al. | 370/352 |

OTHER PUBLICATIONS

Lords, Tom, "http://samspade.org/ssw/help/d_regex.htm," Regular Expressions, Internet Source (Berkley, California), p. 1-11, (1996).

Handley et al., "Internet Draft," SIP: Session Initiation Protocol, Network Working Group, p. 1-141, (Mar. 1999).

Arango et al., "Internet Draft," draft-huitema-megaco-mgcp-v0r2-05.txt, Media Gateway Control Protocol (MGCP), Internet Engineering Task Force, p. 1-119, (Feb. 21, 1999) draft-huitema-megaco-mgcp-v0r2-05.txt.

Cuervo et al., "Internet Draft", draft-ietf-megaco-protocol-00.txt, MEGACO/H.GCP, Internet Engineering Task Force, p. 2-71, (Jul. 20, 1999).

Cromwell et al., "Internet Draft," draft-cromwell-navdec-mgcp-audio-pkg-00.txt, A Syntax for the MGCP Audio Package, Internet Engineering Task Force, p. 1-21, (Nov. 1998).

Cromwell et al., "Internet Draft," draft-cromwell-navdec-media-req-00.txt, Requirements for Control of a Media Services Function, Internet Engineering Task Force, p. 1-27, (Nov. 1998).

Huitema et al., "Internet Draft," draft-huitema-megaco-mgcp-flows-01.txt, Media Gateway Control Protocol (MGCP) Call Flows, Internet Engineering Task Force, p. 1-125, (Jan. 1999).

Fischell et al., "Interactive Voice Technology Applications," AT&T Technical Journal, vol. 69, No. 5, Sep./Oct. 1990, Short Hills, NJ, pp. 61-76.

European Search Report for EP 0030934.3-2414, mailed Feb. 10, 2004.

Arango, Mauricio et al., "Media Gateway Control Protocol (MGCP) Version 0.1," IETF, Internet Draft, Feb. 21, 1999, XP002278702, Retrieved from the Internet, <URL:http://www.cds.columbia.edu/sip/drafts/draft-huitema-megaco-mgcp-v0r1-05.txt>.

Bayer, M. "Four Things to Remember." ECTF Framework, Oct. 6, 1999, XP002212522, retrieved from the Internet, <URL:www.ctexpert.com/BayerIPR.pdf>.

Cromwell, D., "Proposal for an MGCP Advanced Audio Package," Network Working Group, RFC 2897, Aug. 2000, XP002212513, Retrieved from the Internet, <URL:http://www.ietf.org/rfc/rfc2897.txt>.

Cromwell, D. et al., "Requirements for Control of a Media Services Function," IETF, Internet Draft, Nov. 1998, XP002278701.

Cromwell, D. et al., "Suggested Requirements for Control of an IVR Function," IETF, Internet Draft, Apr. 1999, XP002278699, <URL:http://ftp.ist.utl.pt/pub/drafts/draft-cromwell-megaco-ivr-req-00.txt>.

Cromwell, D., "A Syntax for the MGCP Audio Package," IETF, Internet Draft, Nov. 1998, XP002278700, Retrieved from the Internet, <URL:http://www.openphone.org/docs/mgcp/draft-cromwell-navdec-mgcp-audio-pkg-00.txt>.

European Search Report for Application No. 0030981.2, issued on May 17, 2004.

\* cited by examiner

| Index File | | | | | | |
|---|---|---|---|---|---|---|
| Audio ID | Package ID | Package Ver. | Offset | Len | Segment Format | Checkdata |
| 1234 | 2 | 1 | 20 | 2000 | 1 | 1234 |
| 5678 | 2 | 2 | 2020 | 1800 | 2 | 9876 |
| 9012 | 7 | 3 | 3820 | 14000 | 2 | 5432 |
| 2345 | 8 | 2 | 17820 | 10000 | 2 | 1755 |

```
CATALOG FILE RECORD

Record Number 4
Audio Identifier: 5678
Title: Busy Circuit Announcement
Text: All circuits are busy. Please try your call again later.
Codec: G.711
Format: alaw
Recording date: September 19, 1998
Version: 1.0
Voice Identifier: Jane Smith, International Talent Inc.
Group: NA
Subgroup: NA
Language: English
Release Notes: New prompt
Checkdata: 110393453
```

FIG.11

METHODS AND SYSTEMS FOR BUILDING AND DISTRIBUTING AUDIO PACKAGES

TECHNICAL FIELD

The present invention relates generally to methods and systems for building and distributing audio packages. More particularly, the present invention relates to methods and systems for building and distributing audio packages containing audio segments to be played by gateways in a telecommunications network.

RELATED ART

In conventional telecommunications networks, a central switch provides audio data to users that access the switch. For example, to play an announcement, such as, "The time is five o'clock", a central switch includes application software and hardware specifically designed to determine the time and "play" the announcement. Changing the original function or providing new functions requires new application software, and possibly even hardware upgrades at the central switch.

FIG. 1 illustrates a conventional telecommunications network including a central switch. In the network illustrated in FIG. 1, a central switch S1 includes announcement software 100 and hardware 102 to provide user access to audio data. End users 104, such as residential telephone customers, access the stored audio data through the public switched telephone network (PSTN) 106 and access devices 108. In the network illustrated in FIG. 1, all calls are routed through switch S1. Thus, in this type of network, it makes sense to provide audio data access through switch S1. However, as stated above, in order to add new services, hardware and/or software modifications at switch S1 are required.

More recently, functionality for providing audio data and other conventionally centralized features to end users has been distributed across network elements. In a distributed network environment, end users can communicate with each other over a packet-based network, such as an Internet Protocol (IP) network, in which the path that a message takes through the network is not guaranteed. In such a network, end users can communicate with each other and with other network elements through access devices or gateways that translate between circuit- and packet-based communications protocols. Call servers control gateways and perform call-related functions, such as call setup. A gateway is a device that connects end users to an IP network. Thus, when user A desires to call user B, the gateway and call server for user A contact user B through the gateway and call server for user B. Communication occurs between user A and user B by sending packets over the network.

Audio servers store audio data to be played to users, record audio from users, and collect digits from users. For example, an audio server managed by a telephone company might play an announcement indicating the company name when the user accesses the company's telephone network.

In a distributed network environment, audio services can be provided by gateways connected to end users as well as by audio servers. For example, for messages that are frequently accessed and that require little processing, it does not make sense to waste network resources on establishing a connection between an end user and an audio server. These simple messages are more conveniently provided by gateways connected to the end users. However, because a telecommunications network can include many gateways, the labor required to provision the gateways is increased.

In addition, it is desirable that gateways in a network be provisioned consistently. For example, when a call server instructs a gateway to play announcement #1, that announcement should be the same as announcement #1 on another gateway in the same network. With manual provisioning, there is no reliable mechanism to ensure this consistency.

Thus, in light of these difficulties, there exists a need for improved methods and systems for building and distributing audio packages containing announcements to be played by gateways.

DISCLOSURE OF THE INVENTION

The present invention includes methods and systems for building and distributing audio packages from an audio database. In order to provide a central source for audio files, announcements are provisioned first on a provisioning server and audio identifiers are created. As used herein, the term "audio identifier" refers to a number or code that uniquely identifies an audio segment. An audio segment is the atomic unit of audio stored on a computer-readable medium. For example, a segment might be a file containing the recorded announcement "all circuits are busy". The call server services are then configured using these audio identifiers. Audio that is desired to be present on gateways or other network elements is then selected via a provisioning interface provided by an audio package builder/export tool executing on the provisioning server. The provisioning interface allows a remote user to select audio files to be included in an audio package. The audio package builder/export tool bundles the selected audio and its associated information, and creates three files: an audio segments file, an index file, and a catalog file. These files can then be exported to any network element that understands their format.

The audio segments file created by the audio package builder/export tool contains the audio for all of the segments selected. The index file maps the audio identifiers of the segments selected to the offset and length of the corresponding audio in the audio segments file. The catalog file is a non-executable file, and contains ancillary information from the audio database, such as prompt text, title, voice talent, date recorded, etc.

Once created, the audio package can be sent to the desired network nodes for use. The receiving gateway or switch is not required to know anything about the specific contents of the exported package, other than the format of the exported package. This method of building and distributing audio packages provides simple, reliable provisioning based on a universal provisioning server database and guarantees network-wide consistency in audio identifiers. As a result, any network node that is instructed by a service engine to play a specific prompt will play the same prompt.

The methods and systems for building audio packages and distributing the audio packages according to the present invention may be implemented as computer-executable instructions embodied in a computer-readable medium. As used herein, the phrase "computer-readable medium" refers to any electrical, optical, or magnetic medium capable of storing data readable by a computer. For example, computer-readable media suitable for use with the present invention include, but are not limited to, optical disks, magnetic disks, and memory devices.

BRIEF DESCRIPTION OF THE DRAWINGS

A description of the invention will now proceed with reference to the accompanying drawings of which:

FIGS. 6-8 are computer-generated images illustrating exemplary windows of a graphical user interface for creating an audio package according to an embodiment of the present invention;

FIG. 9 is a block diagram illustrating an index file according to an embodiment of the present invention;

FIG. 11 is a block diagram illustrating a record from a catalog file according to an embodiment of the present invention.

DETAILED DESCRIPTION OF THE INVENTION EXEMPLARY OPERATING ENVIRONMENT

Figure 1:
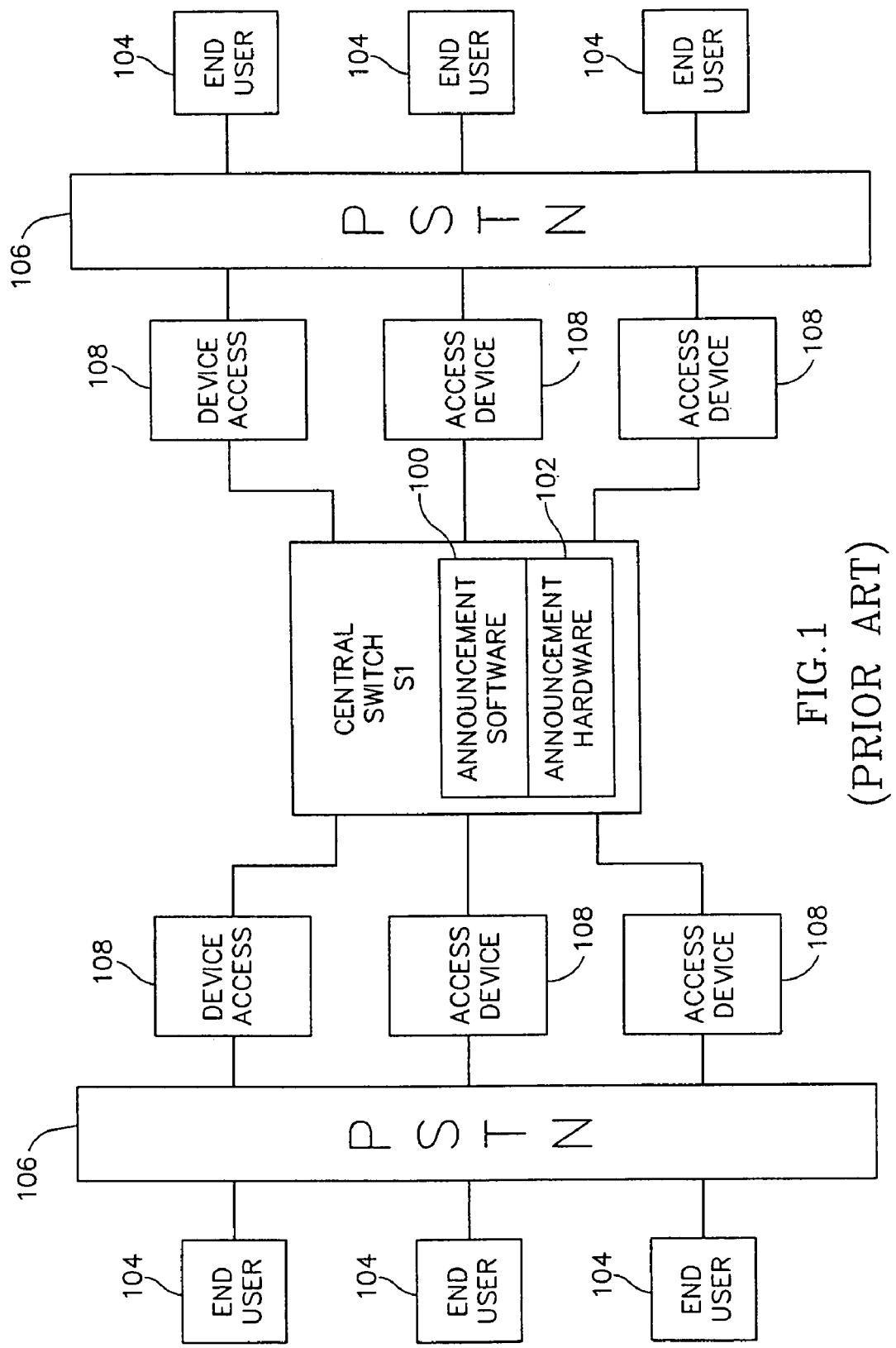
FIG. 1 is a block diagram illustrating a conventional telecommunications network.
Figure 2:
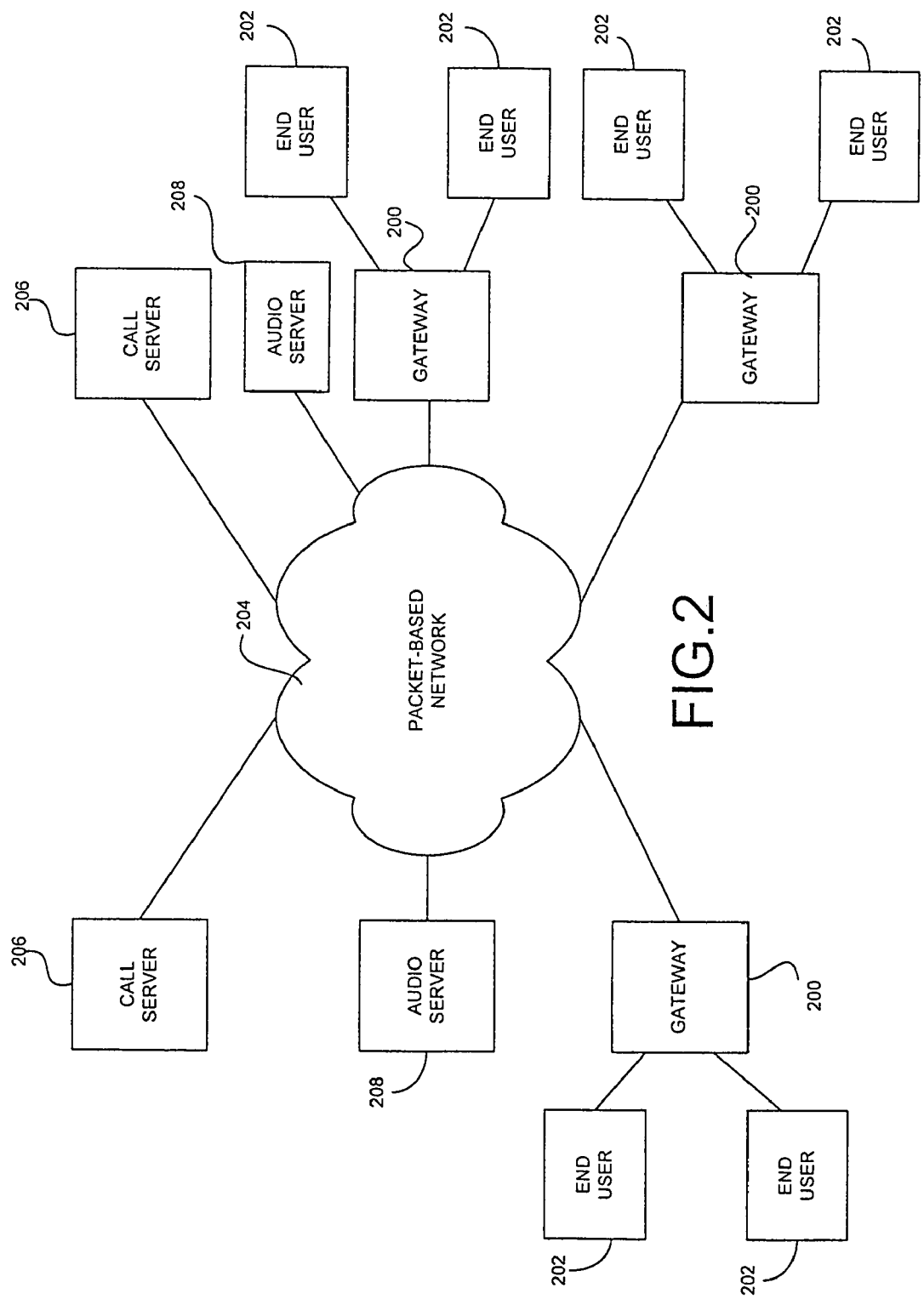
FIG. 2 is a block diagram illustrating an exemplary operating environment for the methods and systems for building and distributing audio packages according to the present invention.

FIG. 2 illustrates an exemplary operating environment for the methods and systems for building and distributing audio packages according to the present invention. In FIG. 2, a plurality of gateways 200 allow end users 202 to communicate with each other over a packet-based network 204, such as a TCP/IP over ATM network. Gateways 200 translate between circuits and packets and vice versa. Gateways 200 may also play simple, frequently accessed announcements to end users 202. Call servers 206 perform call processing functions, such as call setup and tear down. Call servers 206 also control gateways 200 and audio servers 208 to play announcements to end users 202. Audio servers 208 play announcements to end users 202 through packet-based network 204. However, because audio servers 208 must access network 204 to play announcements to end users 202, it is preferable that at least some announcements be stored on gateways 200. These announcements are preferably announcements that are commonly accessed and require little processing resources. For example, it does not make sense to waste network resources in establishing a connection between an end user 202 and one of the audio servers 208 in order to play the announcement, "The network is congested, please try your call again at another time". Thus, the present invention includes methods and systems for building audio packages containing frequently accessed announcements and exporting the packages to external devices, such as gateways 200.

Building and Exporting Audio Packages

Building and exporting audio packages includes the following steps:
creating the audio
provisioning the audio on the audio server and the provisioning server
creating a package of desired audio
exporting the package to the desired network elements.

Step 1: Creating the Audio

The creation of audio files can be accomplished any number of ways. For example, network-based announcements are created in a studio environment to ensure the highest quality recordings. Alternatively, there are a wide variety of software tools such as Sound Forge, available from Sonic Foundry, that can be used to create and edit audio files. Once the audio files are created, the audio files are preferably stored in a storage medium, such as a disk storage medium, available to a web browser-(e.g., Netscape Navigator or Internet Explorer) enabled computer.

Step 2: Provisioning the Audio on the Audio Server and the Provisioning Server

Figure 3:
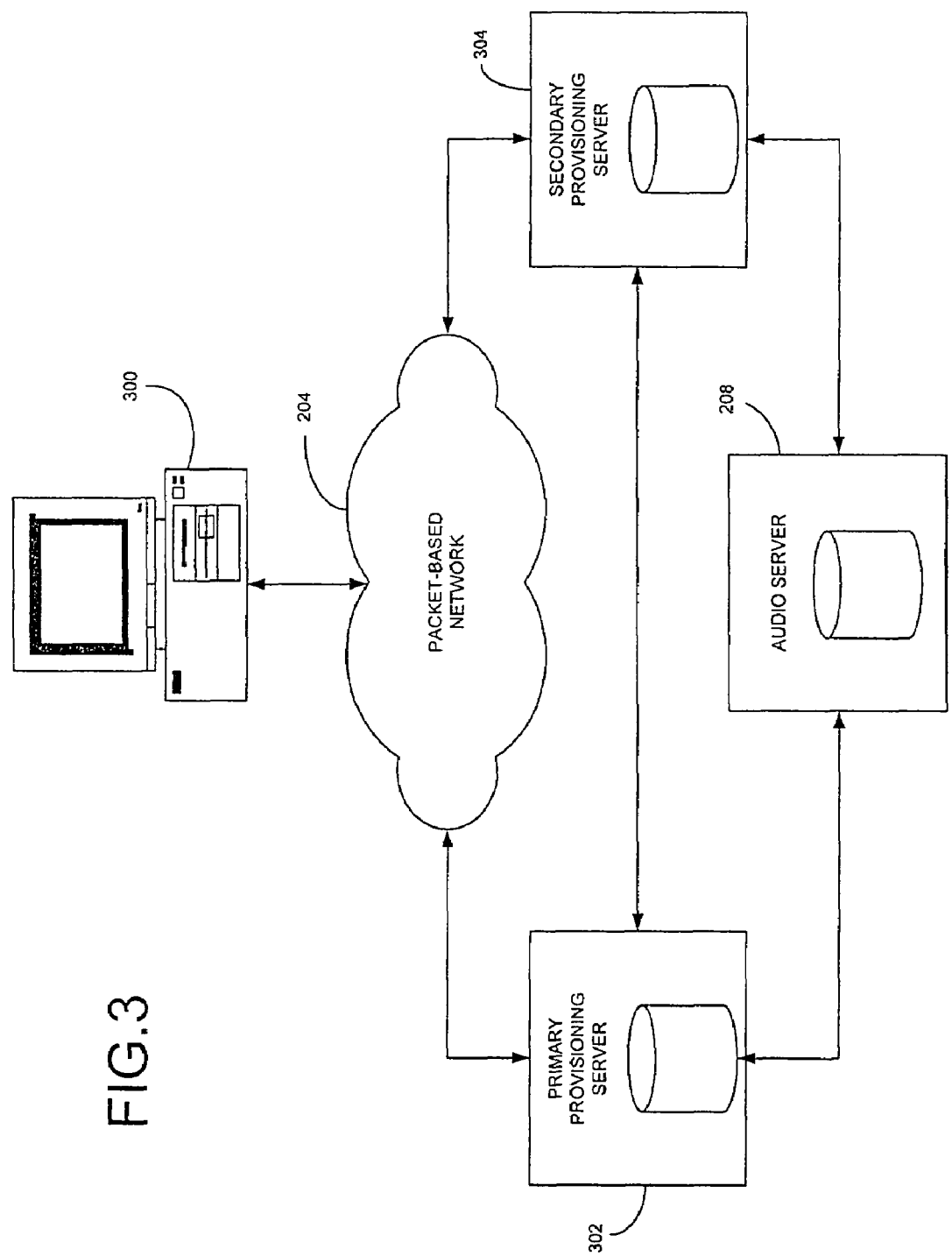
FIG. 3 is a block diagram illustrating a system for provisioning audio on provisioning servers and audio servers according to an embodiment of the present invention.

Provisioning according to the present invention is the process by which audio files are transferred to and stored in storage media managed by audio servers and provisioning servers. FIG. 3 illustrates an exemplary system for provisioning audio on audio servers and provisioning servers. In FIG. 3, client 300 includes hardware and software for storing audio files created as described above and for distributing the audio files to other entities. For example, client 300 can include a personal computer equipped with a network communications adapter, such as an ethernet adapter. Exemplary client software can include a web browser or other suitable communications software for communicating with primary and secondary provisioning servers 302 and 304, respectively, over packet-based network 204. Provisioning servers 302 and 304 include hardware and software for receiving audio files from client 300, for distributing audio files to audio servers, and for building and exporting audio packages to gateways. Exemplary provisioning server hardware suitable for use with the present invention can include server computers equipped with network communications adapters, such as ethernet adapters. Exemplary software suitable for communicating with client 300 can include a web server. An audio package builder/communicator can also execute on primary provisioning server 302 to build audio packages and export audio packages to gateways and other network entities.

Audio server 208 plays audio to end users in response to requests from call servers (not shown in FIG. 3). As such, audio server 208 can include hardware, including network communications hardware and software for playing announcements to end users. Exemplary audio server hardware and software suitable for use with the present invention is described in a commonly-assigned, co-pending U.S. patent application entitled "Methods and Systems for Accessing Stored Audio Data Over a Network", filed on even date herewith, and the disclosure of which is incorporated herein by reference in its entirety.

Provisioning audio on primary provisioning server 302 according to one embodiment of the present invention is performed via a JAVA applet executing in a web browser on client 300. First, the audio file to be provisioned is preferably transmitted from client 300 to primary provisioning server 302. Audio files can be transmitted to primary provisioning server 302 via any suitable file transfer protocol, such as FTP. The audio files are placed in a user-specified directory on primary provisioning server 302. The JAVA applet executing on client 300 issues requests to JAVA servlets loaded into the web server executing on primary provisioning server 302 to accomplish tasks needed to provision the audio database of primary provisioning server 302. The requests can be formatted in a proprietary message protocol that is understood by the JAVA applet (client) and the JAVA servlet (server), and they can be transmitted via a standard transport protocol, such as HTTP. Once the audio files are stored in the audio database of primary provisioning server 302, the audio files are automatically stored on secondary provisioning server 304 and audio server(s) 208.

The web server executing on primary provisioning server 302 presents a graphical user interface to the user of client 300 through the client's web browser to collect various data associated with the announcement such as announcement title, text, date recorded, voice talent used, etc., along with the audio file itself. Once the user enters the appropriate information, this data relating to the audio file is transmitted to primary provisioning server 302 via its web servers and loaded into a relational database.

Figure 4:
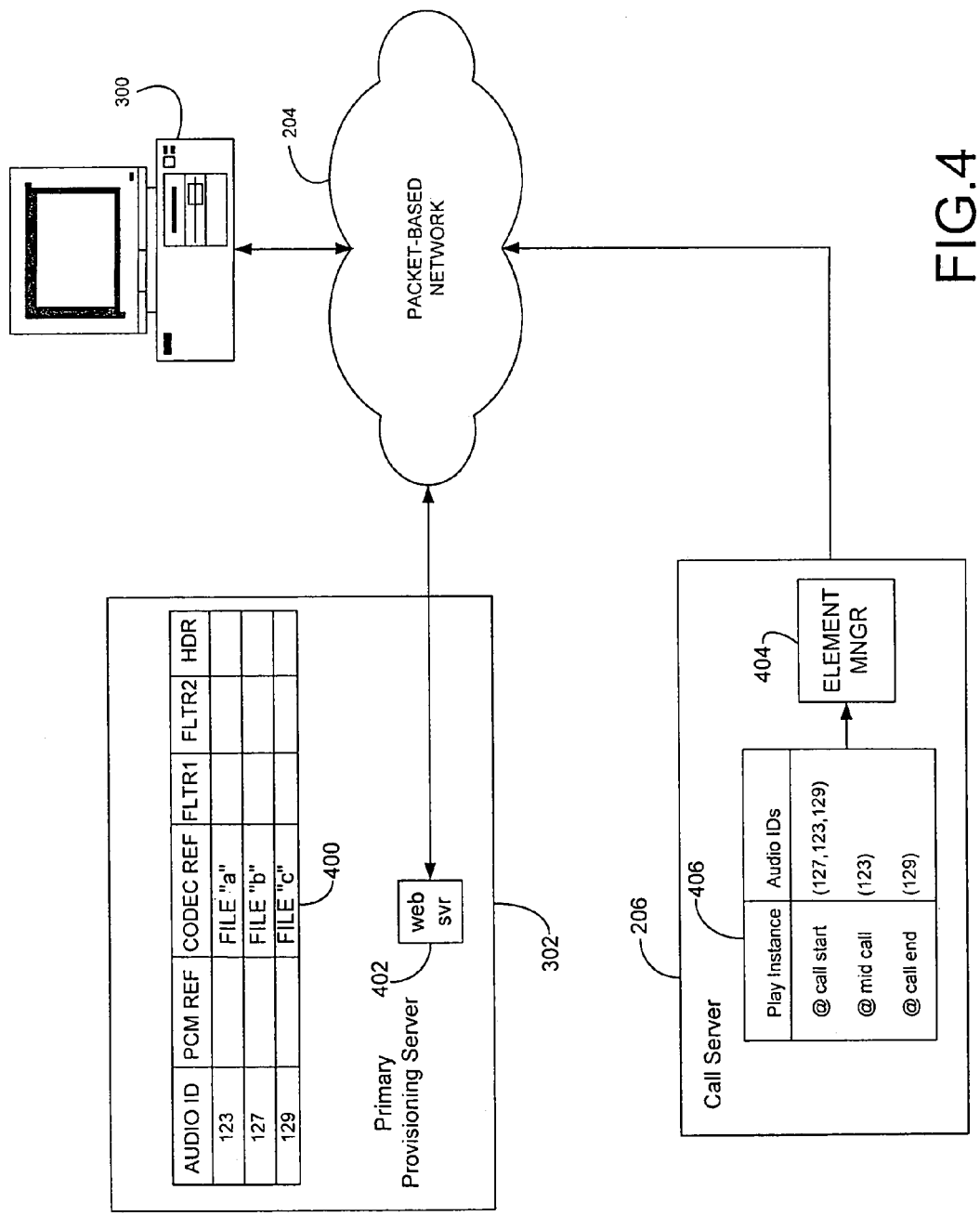
FIG. 4 is a block diagram illustrating a system for communicating audio identifiers to a call server according to an embodiment of the present invention.

As discussed above, call servers control gateways to play audio to end users. As a result, call servers need to know the audio identifiers of all audio files played on a given network and when to instruct gateways to play specified files. FIG. 4 illustrates the process by which a call server is provided with audio identifiers and instructions. In FIG. 4, call server 206 is provisioned with audio identifiers corresponding to audio segments in audio database 400 managed by primary provisioning server 302. Each audio file in audio database 400 includes an audio identifier that uniquely identifies the audio file. The audio identifiers can be assigned automatically when the audio files are stored in audio database 400. Alternatively, the user can select audio identifiers for audio files using a web browser executing on client 300. In the illustrated embodiment, audio database 400 includes three audio segments with audio identifiers "123", "127", and "129". Audio identifier "123" represents an audio segment corresponding to file "a", audio identifier "127" represents an audio segment corresponding to file "b", and audio identifier "129" represents an audio segment corresponding to file "c".

In the illustrated embodiment, call server 206 includes an element manager 404 for receiving audio identifiers from client 300 and storing instructions as to when to play the specific audio segments. Element manager 404 can be any suitable program for receiving the audio identifiers and instructions over the network 204. For example, element manager 404 can be configured to communicate using TCP or UDP. In the illustrated embodiment, element manager 404 stores instructions and corresponding audio identifiers in a table 406. The left column in table 406 includes instructions as to when audio segments are to be played. The right column in table 406 includes audio identifiers corresponding to the instructions in the left column. For example, in the illustrated table, audio segments corresponding to audio identifiers 123, 127, and 129 are played at the start of a call. The audio segment corresponding to the audio identifier 123 is played in the middle of a call. Finally, the audio segment corresponding to audio identifier 129 is played at the end of a call.

An example of instructions and corresponding audio identifiers that can be data filled on a call server relates to branding. Branding refers to the playing of a company- or product-specific announcement during a call. For example, when a caller accesses a network managed by AT&T, the caller hears the announcement, "This is AT&T". Similar announcements can be played for MCI and Sprint when a caller accesses an MCI network or a Sprint network. Thus, table 406 in call server 206 can store audio identifiers corresponding to announcements for AT&T, MCI, and Sprint networks. The instructions corresponding to the audio identifiers can include instructions for playing the appropriate announcement based on the network that a caller is trying to access. When a call that accesses a particular company's network is received from an end user, the call server performs a lookup in table 406 for the company and instructs the gateway to play the announcement for that company. Thus, data filling the call server with audio identifiers and instructions allows the call server to instruct gateways to play the appropriate announcements.

Step 3: Creating a Package of Desired Audio

Figure 5A:
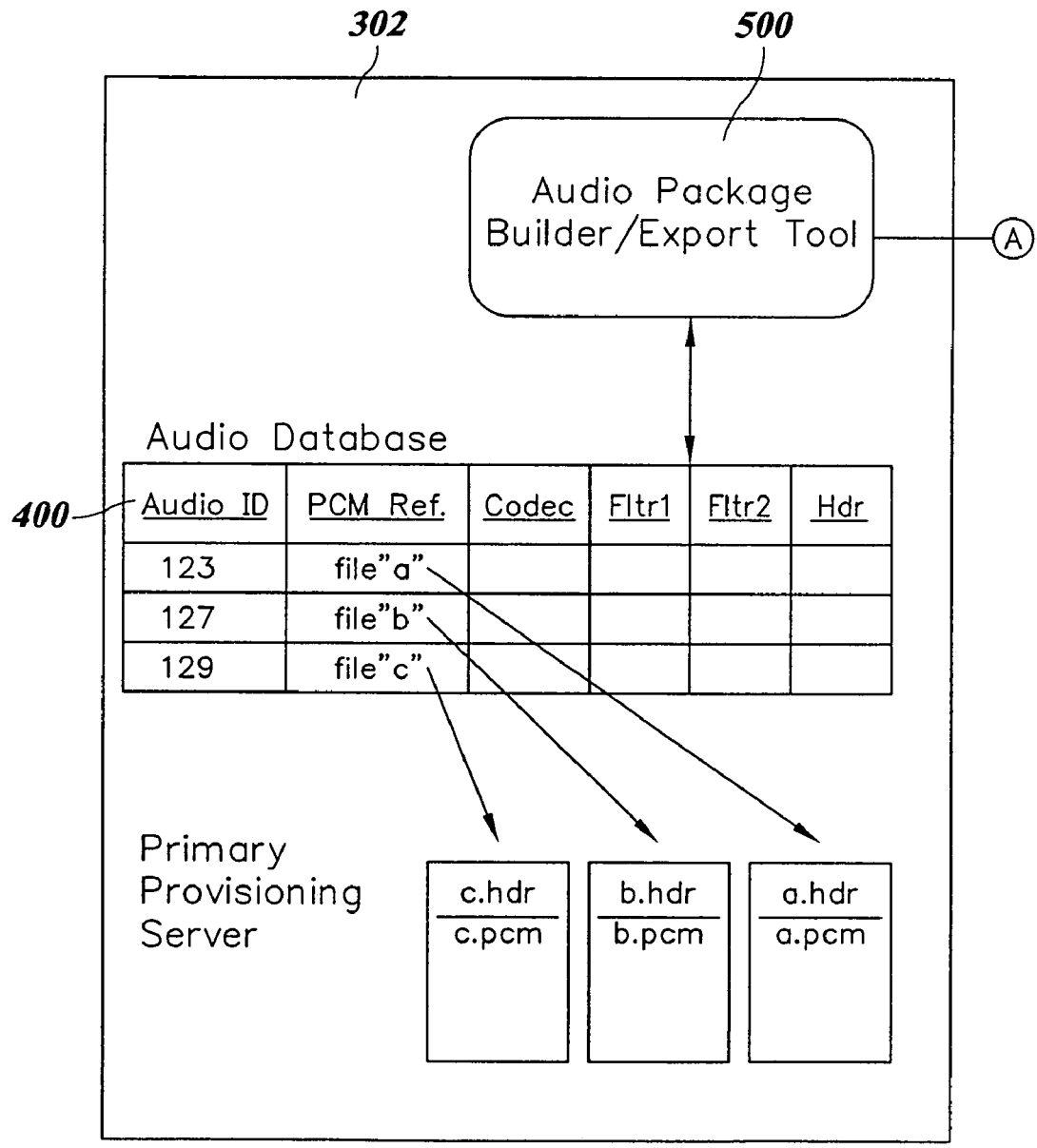
FIGS. 5a and 5b are block diagrams illustrating a system for creating audio packages and for exporting the audio packages to a gateway according to an embodiment of the present invention.
Figure 5B:
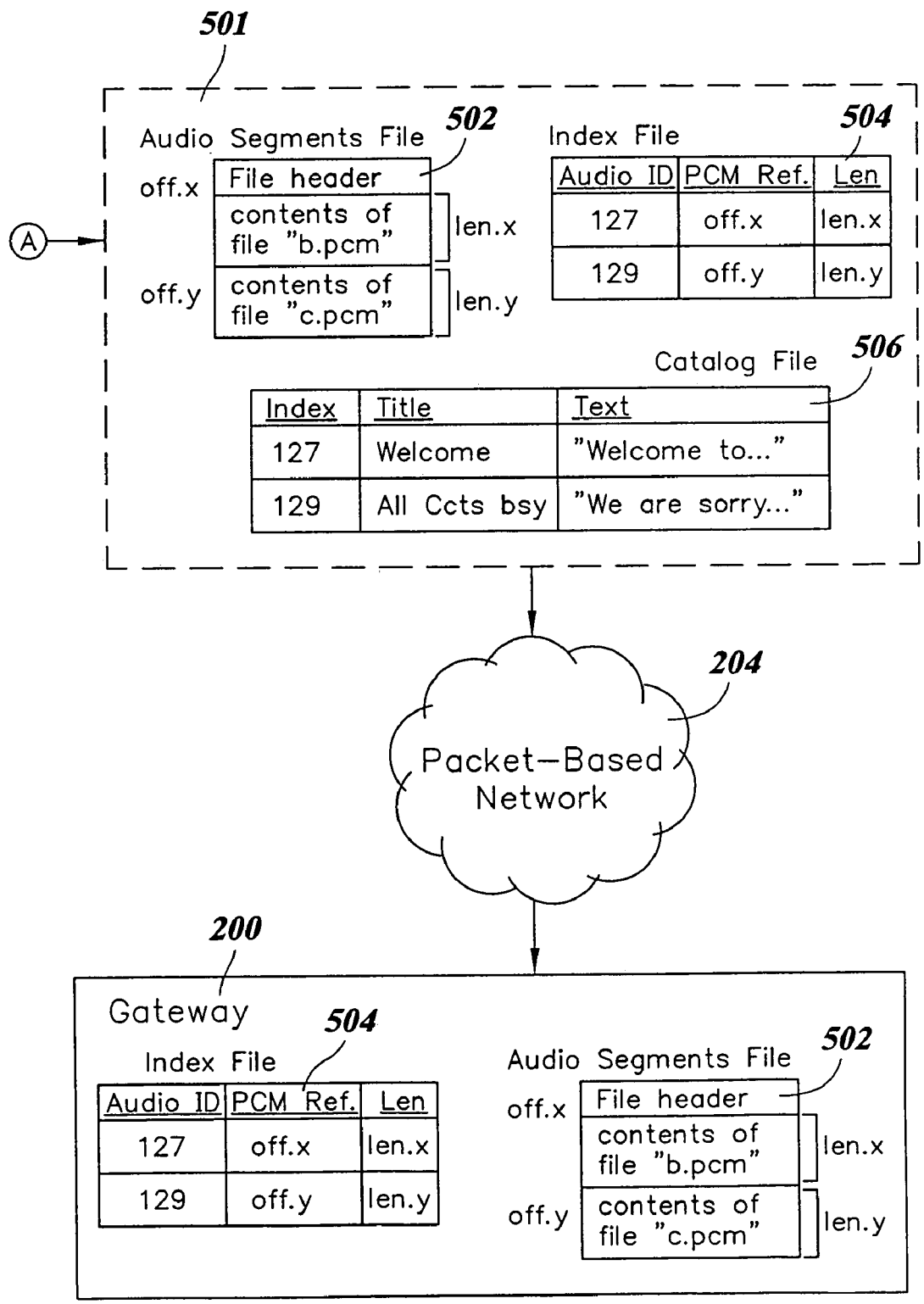

FIGS. 5*a* and 5*b* illustrate an exemplary system for generating audio packages and exporting the audio packages to a gateway. In FIG. 5*a*, primary provisioning server 302 includes audio package builder/export tool 500. Audio package builder/export tool 500 includes a graphical user interface that allows a user, through client 300, to select audio segments to be included in an audio package. Audio package builder/export tool 500 also includes computer-executable instructions for building audio packages from audio database 400 and for creating package definitions to be stored in database 400. In the illustrated embodiment, audio package 501 includes audio segments file 502, index file 504, and catalog file 506. The structure of each of these files in audio package 501 will be discussed in more detail below.

Conceptually, an audio package created for export to other network elements (such as gateways) could contain the entire contents of relational database 400 on primary provisioning server 302. However, in a preferred embodiment of the invention, a small subset of audio, characterized by high use and low processing requirements, is selected with the graphical user interface presented through the web browser executing on client 300.

As stated above, the JAVA applet executing on the client's web browser sends requests to primary provisioning server 302 to provision audio databases. The requests can also include requests for building and exporting audio packages.

Exemplary requests that can be sent from client 300 to primary provisioning server 302 to support the creation and export of audio packages include:

user authenticate
create physical segment
get physical segment
get packages
create package
add physical segment to package
delete physical segment from package
get package contents
lock package
export package.

A user authenticate request allows only authorized users to create audio packages. A create physical segment request allows the user to add a segment to database 400. A get physical segment request allows a user to view physical segments stored in database 400. A get packages request allows a user to view packages stored in the database 400.

A create package request allows a user to create a new audio package in database 400. An add physical segments to package allows a user to add segments to a package created by a create package request. A get package contents request allows a user to view the contents of a previously-created package. A delete physical segments from package allows a user to remove segments from a package. A lock package request allow a user to lock a package to prevent modification of the package. An export package request allows a user to export a package to a location accessible by client 300 so that the package can be transmitted to gateways.

An audio package according to an embodiment of the present invention is a persistent, versioned entity tracked in database 400 on primary provisioning server 302. Once created, if an audio package is edited and changed, the changed package is given a new version number. Therefore, previously created packages can be reviewed, recreated, and augmented.

In creating a package, the following steps are taken:

A new, empty, named package is created.

Audio segments are added to (or later subtracted from) the package. The audio segments are also versioned. If a package is recreated, and one of the audio segments has been updated, a warning is preferably provided to the user.

Once all segments are added, the package is locked. Once locked, the contents of that version of the package are fixed.

The package is exported to a location from which the package can be distributed to gateways and/or other switch types. In a preferred embodiment of the invention, the three files referenced above (audio segments, index, and catalog) are exported. Copies of the files can be retained in the file system of primary provisioning server 302 for tracking purposes. The package definition used to generate the files may be retained in the database.

Figure 6:
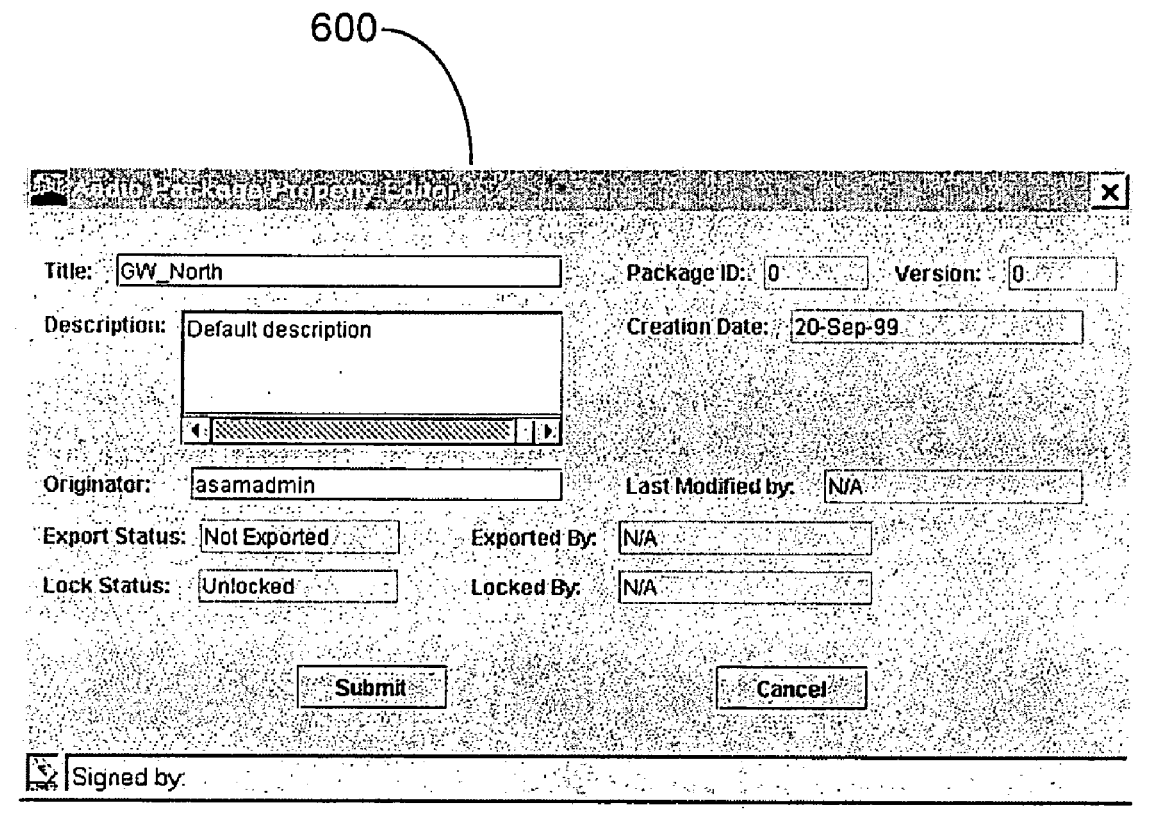

FIG. 6 illustrates an exemplary property editor window of the graphical user interface that can be used to create an audio package. In FIG. 6, the property editor window 600 includes input cells for receiving a name for the package, a description of the package, and the originator of the package. Additional cells display information regarding the package. Once the user clicks on "submit", a record is created or modified for the audio package in audio database 400 of provisioning server 302.

Figure 7:
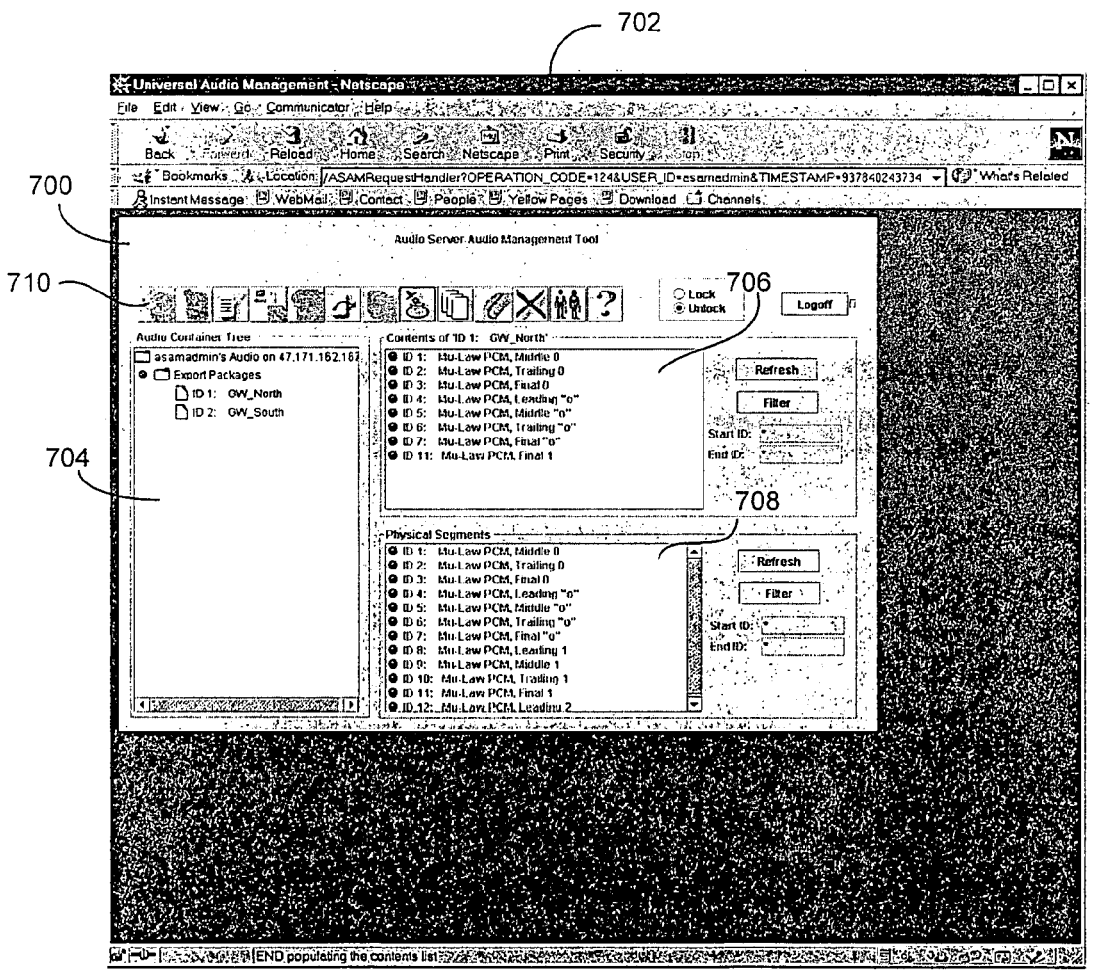

Once the user has created a file for the audio package, the user can select audio segments to be added to or subtracted from the package. FIG. 7 illustrates a manage audio window 700 embedded in a browser window 702. Manage audio window 700 includes a first area 704 that displays audio package names in a tree format and allows a user to select audio packages. Contents area 706 displays contents of the audio package selected in area 704. A third area 708 includes a list of audio segments available for package building. Thus, in order to add audio segments to an audio package, the user highlights a segment in area 708 and clicks on the appropriate button on tool bar 710 to add the segment to the selected audio package.

Figure 8:
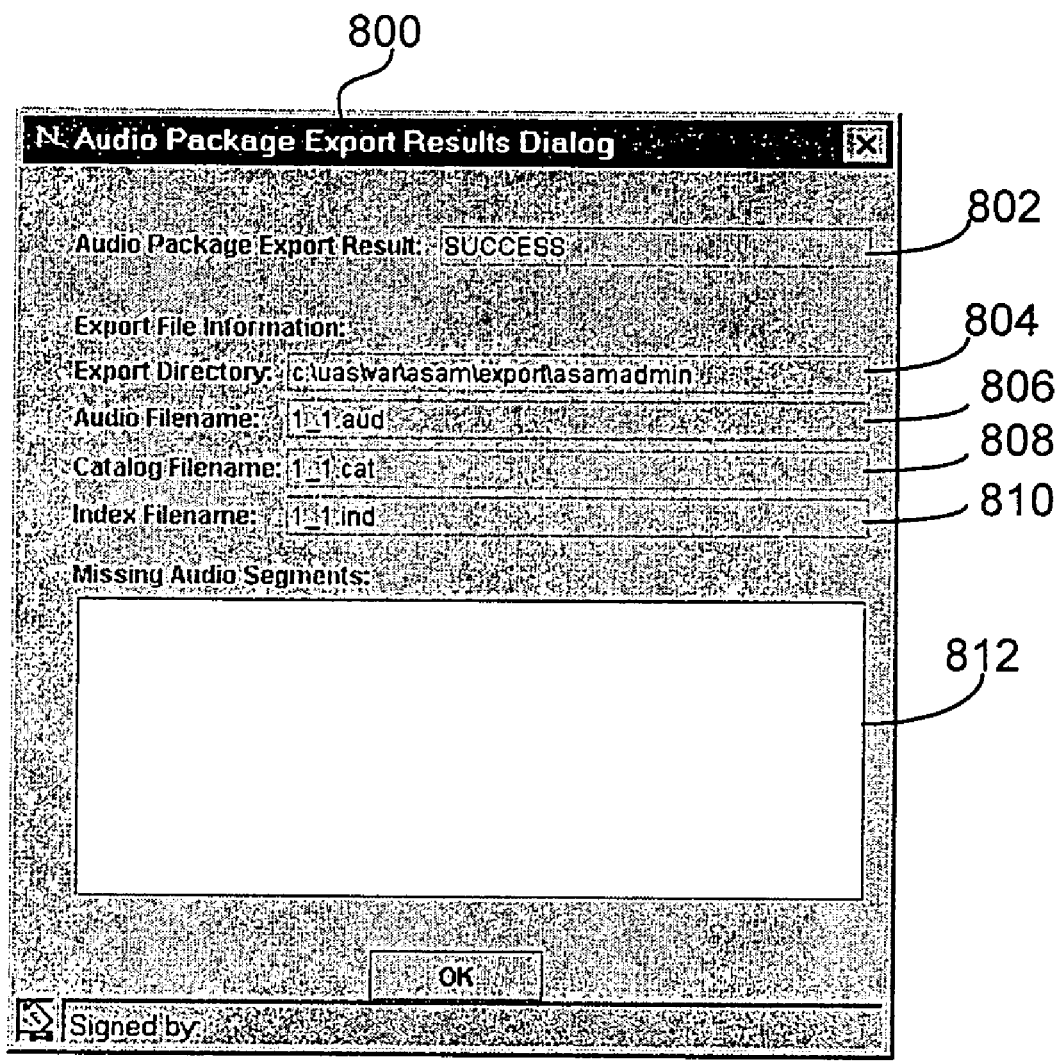

Once the user has selected the audio segments to be included in an audio package, and selects the export button on toolbar 710 audio package builder/export tool 500 illustrated in FIG. 5a creates the audio segments file, the index file, and the catalog file based on the information selected by the user. The location to which the package is exported can be a fixed location on the provisioning server based on the user ID, the package ID, and the package version number. The file location and file names are displayed to the user in an export results dialog window. FIG. 8 illustrates an exemplary package export results dialog window 800 that displays the results of exporting a package. In FIG. 8, package export results dialog window 800 includes first display cell 802 that indicates whether the package was exported successfully. Export directory display cell 804 indicates the file location to which the package was exported. The file location can be a location on primary provisioning server 302 or client 300. The user of client 300 can then transfer the package to gateways in any suitable manner, e.g., electronically using FTP, or manually, using a disk. In an alternative embodiment, for example, as illustrated in FIG. 5b, the package can be exported directly to gateways.

Referring again to FIG. 8, display cells 806, 808 and 810 indicate the audio segments, catalog, and index file names, respectively, that are stored in the location indicated by export directory display cell 804. Finally, display cell 812 indicates segments that were requested to be included but not included in the package because the segments were deleted from the database after the package was locked, but before the package was exported.

Audio Package Format

As mentioned previously, the three files in the audio package that are delivered to a gateway are the index file, the audio segments file, and the catalog file. The format and contents of each file will be more completely described below; however, a short description of each file type will facilitate understanding of the rationale for this division of information.

Referring back to FIG. 5b, index file 504 includes information to be used by a gateway to play an audio segment in audio segments file 502. For example, index file 504 can include an audio identifier for each audio segment in audio segments file 502 and information indicating the location of the audio segment in audio segments file 502. In the illustrated embodiment, index file 504 includes audio identifiers, offsets, and lengths for each audio segment in audio segments file 502. For example, the illustrated index file indicates that the audio segment corresponding to audio identifier "127" is located at offset in length "off.x" in audio segments file 502. Index file 504 also stores the length of the audio segment corresponding to audio identifier "127". Thus, in order to instruct gateway 200 to play the audio segment corresponding to audio identifier "127", a call server sends a request to gateway 200. The request includes audio identifier "127". The gateway searches the index file to determine the location and length of the audio segment for the announcement in the audio segments file. Gateway 200 then extracts the audio segment from the audio segments file and plays the audio segment to an end user.

One advantage to using an index file is that it provides a standard mechanism for accessing audio, regardless of the internal format of the actual audio files. The index file also allows audio to be distributed among multiple files. This could be useful for managing audio by grouping logically related segments in the same file. Another advantage to the index file is that it promotes a flexible system. Audio files can vary from one to a large number of audio segments.

Another file included in an audio package is catalog file 506. This file is preferably a text file, such as an ASCII file, that is used to document audio segments included in audio segments file 502. Catalog file 506 includes textual information that describes the audio segments and the characteristics of each segment (phrasing, recording information, etc.) For example, in the illustrated embodiment, catalog file 506 includes a title and a textual representation of the announcement corresponding to each audio segment.

The following sections include a more complete description of the audio segments file, the index file, and the catalog file according to the present invention. The description is merely illustrative of file formats suitable for use with the present invention and is not intended to limit the invention to the specific formats described.

The Index File

The index file includes the information required to play each audio segment. FIG. 9 illustrates an exemplary data structure for the index file. In FIG. 9, index file includes one record for each audio segment in the audio segments file. Each record includes a plurality of fields storing information regarding the audio segments file. In FIG. 9, each row in table 900 represents a record, while each column represents a field within a record. The name, content, and function of each of the fields is as follows:

audio identifier—4 bytes specifying an integer.
Package ID—(2 bytes)—the ID of the package from which the index file was generated. The package ID combined with the version and an extension, e.g. ".aud", identifies the audio segment file.
Package version—2 bytes—the version of the package from which the index file was generated.
Offset—4 bytes binary—This field includes the starting offset to play the audio segment, indicating the number of bytes from the start of the audio segments file.
Length—4 bytes binary—This field includes the length in bytes of the audio segment.
Segment format—4 bytes binary—This field contains the format needed to play the audio, such as the codec and format (a-law, μ-law, etc.)
Checkdata—4 bytes binary—This field includes data used as a cross-reference to ensure synchronization between the record in the index file, the record in the catalog file, and the actual audio file. The information can be used for auditing and debugging purposes. This field can also hold a checksum or a file size for verifying the integrity of the audio segments file.

In the illustrated embodiment, the total length of one index record is 24 bytes.

The Audio Segments File

Figure 10:
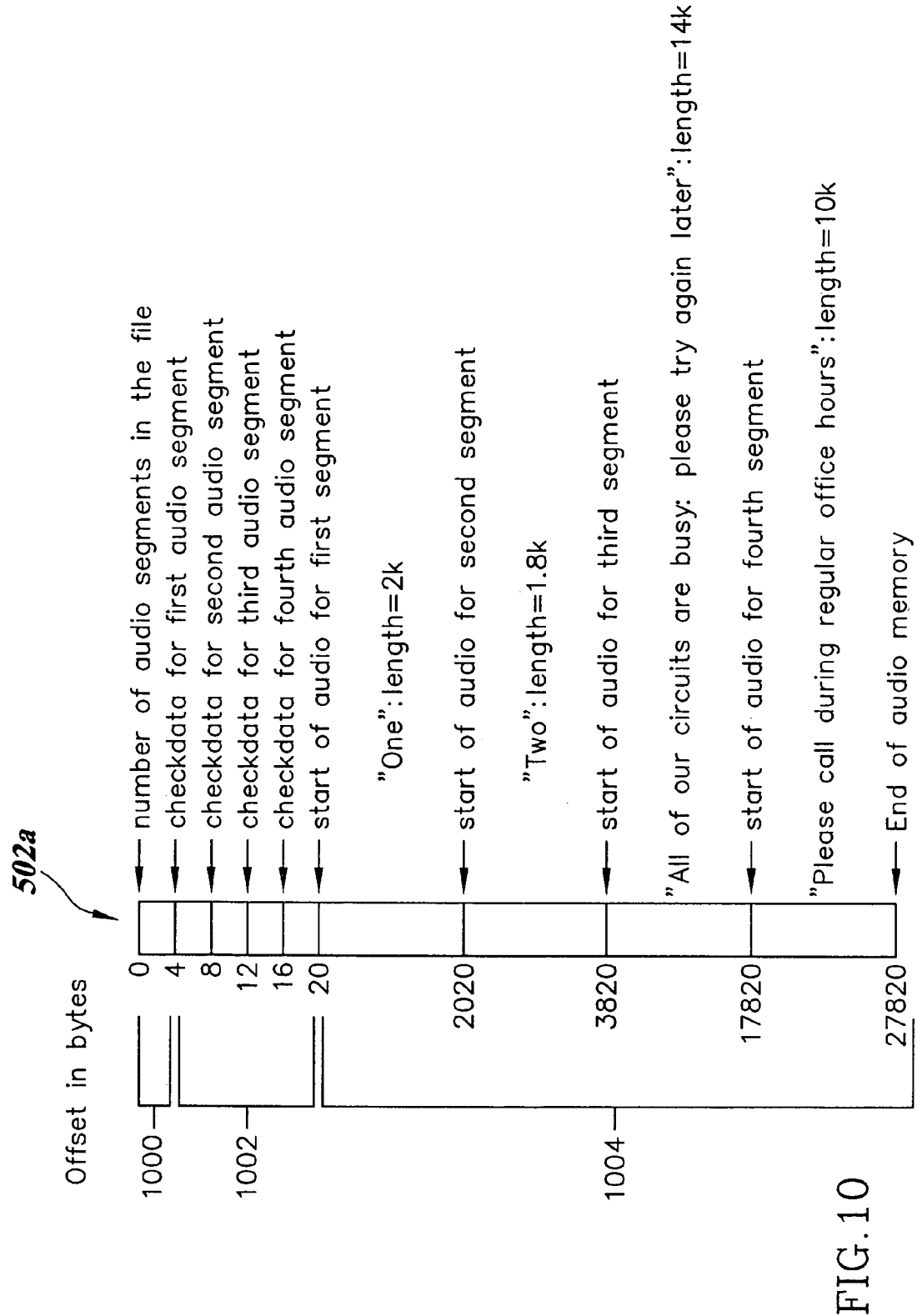
FIG. 10 is a block diagram illustrating an audio segments file according to an embodiment of the present invention.

FIG. 10 is a block diagram illustrating the data structure of an audio segments file according to an embodiment of the present invention. In the illustrated embodiment, audio segments file 502a contains three sections: a first section 1000, a second section 1002, and a third section 1004. In the illustrated embodiment, sections 1000-1004 contain the following information:

The first section 1000 contains 4 bytes that hold the number of audio segments contained in audio segments file 502a.
The second section 1002 contains the checkdata values for all of the audio segments. For each audio segment, there is a 4 byte value. If there are 20 audio segments in the file, there is a group of 80 contiguous bytes containing, the checkdata for the segments. The checkdata value for each segment should match the value in the index and catalog files.
The third section 1004 of audio segments file 502a contains the actual audio segments. The audio segments are preferably stored contiguously in audio segments file 502a.

Catalog File

The catalog file includes information that describes the format and content of the audio segments in a human-readable format. In a preferred embodiment of the invention, the catalog file includes one record describing each audio segment in the audio segments file. FIG. 11 illustrates an exemplary record format for the catalog file. In the illustrated embodiment, and exemplary record 1100 includes the following fields for storing information about each audio segment in the audio segments file:

Audio identifier—This is the same audio identifier referenced in the index file.
Title—a short phrase describing the segment.
Text—the word or phrase contained in the segment.
Codec—G.711, G.728, etc.
Format—μ-law, a-law, ADPCM, etc.
Recording date—when the segment was recorded.
Version—an identifier used to track multiple versions of the same audio segment.
Voice identifier—indicates the voice talent for the audio.
Group—indicates user of the audio.
Subgroup—subset of the group
Language—the language of the segment.
Release notes—an additional field for documenting the version.
Checkdata—This number is the same checksum value that is stored in the index and audio segments file. It is used to ensure synchronization between the various files during auditing and debugging.

Like the index file, the catalog file preferably includes a version number that tracks the format of the catalog file.

Relationships Among the Files

Figure 12A:
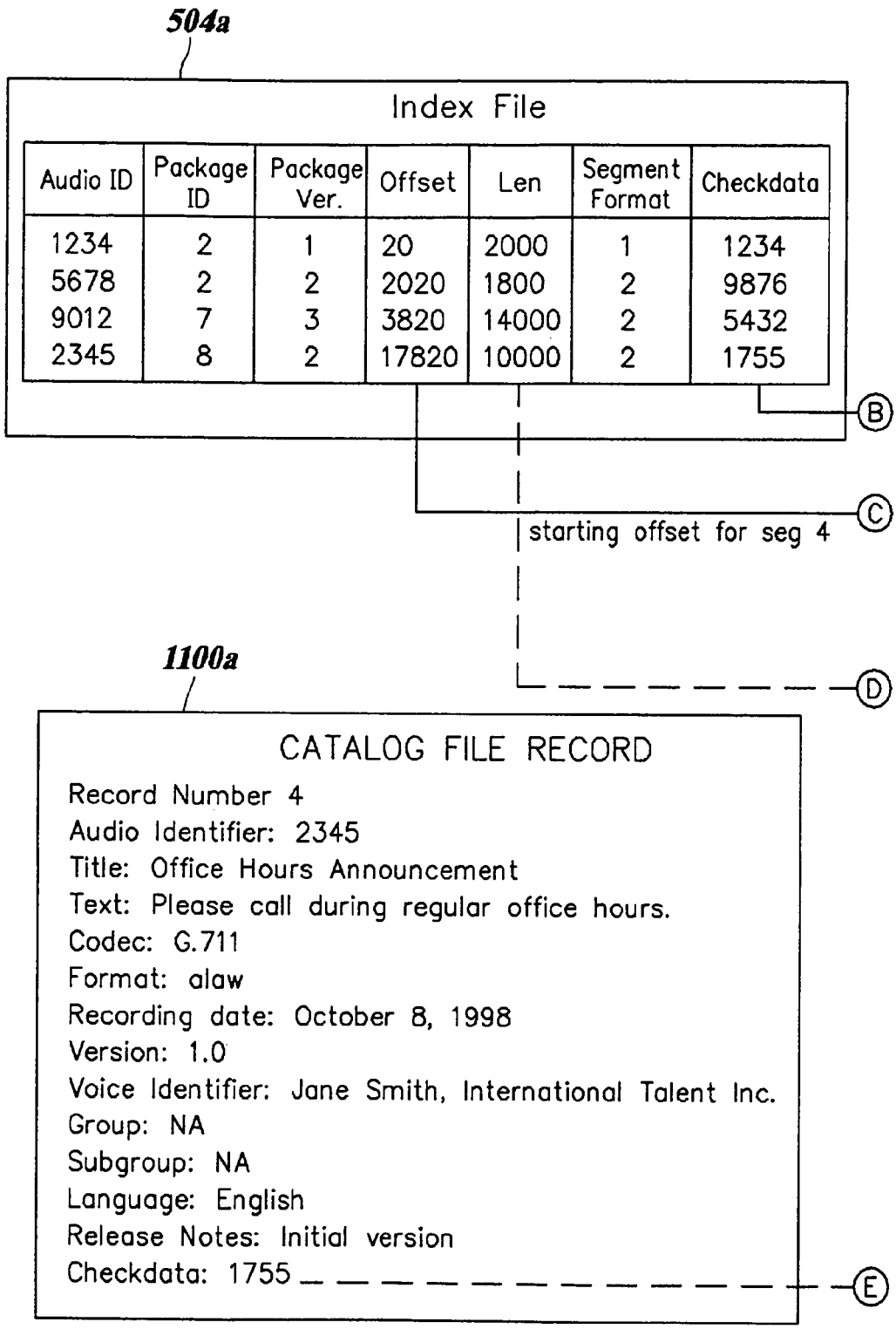
FIGS. 12a and 12b are block diagrams illustrating the relationship between the index file, the audio segments file, and the catalog file according to an embodiment of the present invention.
Figure 12B:
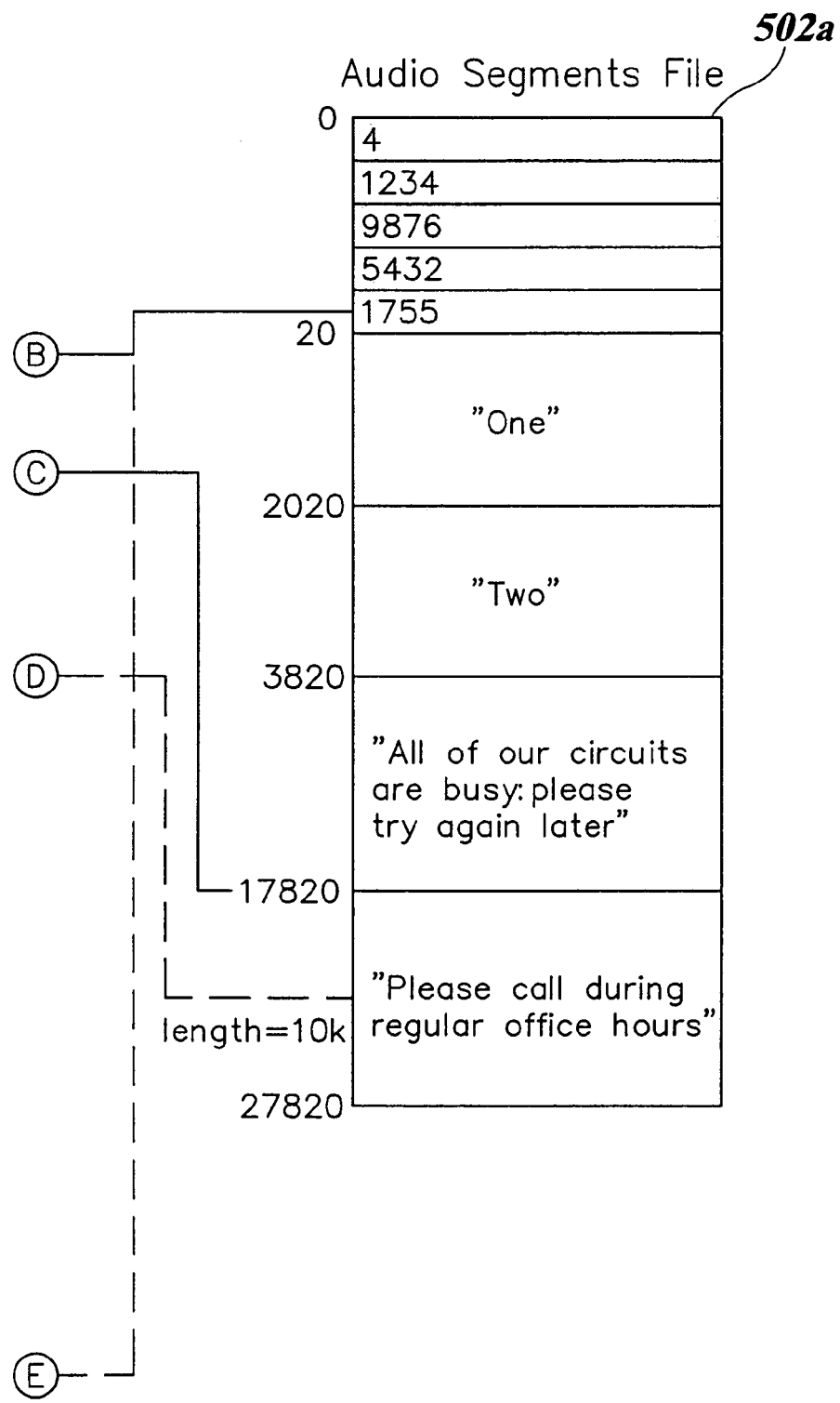

FIGS. 12a and 12b are block diagrams illustrating the relationships between the index file, the catalog file, and the audio segments file. In FIGS. 12a and 12b, index file 504a contains an audio identifier, "2345". The offset field in index file 504a indicates that the audio segment corresponding to the audio identifier "2345" is located at an offset of 17,820 bytes from the beginning of the audio segments file 502a that has a file ID of 0001. The check data fields in the index file 504a, the audio segments file 502a, and the catalog file record 1100a are all equal to "1755" for the audio identifier "2345", thus indicating that the files are synchronized. Finally, the Len field for audio identifier "2345" indicates that the corresponding audio segment in audio segments file 502a is 10 kilobytes in length.

Accessing Audio Segments

In order to access an audio segment corresponding to audio identifier, a gateway or other device performs a lookup in the index file to obtain the offset and length of the audio segment. Depending on the number of audio segments referenced in the index file, the index file can be configured to optimize searches. A b-tree, for example, could be useful in improving access time.

Audio Package Definitions

According to another aspect of the invention, the audio package builder/export tool 500 illustrated in FIG. 5*a* creates an audio package definition and stores the audio package definition in database 400 when a user creates an audio package, as described above. An audio package definition, according to an embodiment of the present invention, contains information sufficient to recreate the audio package and/or allow user modification of the audio package. For example, as illustrated in FIG. 6, each audio package created by a user is assigned a package ID and a version number. The package ID and the version number may be used to index an audio package definition in database 400. The package definition may include a list of audio identifiers corresponding to audio segments included in the audio package. Thus, when a user desires to obtain a copy of a previously-created audio package or create a modified version of the audio package, the user may simply access the package by name using the graphical user interface illustrated in FIGS. 6-8. The audio package builder/export tool may perform a lookup in database 400 for the package ID and version number corresponding to the name. If the user exports the package as is, e.g., by selecting the appropriate button on toolbar 710 illustrated in FIG. 7, audio package builder/export tool 500 may create the files to be included in the audio package for that package ID and version. If the same package with the identical package ID and version were exported before, the files will be overwritten. If the user desires to clone the package definition (causing a new package ID to be assigned and a new package definition to be created in database 400) and then exported without modification, audio file builder/export tool 500 creates a copy of the files that were included in the original audio package.

If the user modifies the contents of a package, audio file builder/export tool 500 preferably creates a new package definition with the same package ID as the original package and a new version number and stores the new package definition in database 400.

Creating and storing audio package definitions in database 400 increased efficiency and accuracy in provisioning audio on gateways. For example, an audio segments file on a gateway may become corrupted or be inadvertently deleted. In this situation, the user simply accesses audio database 400, locates the definition for the previously created package, and exports the package to the gateway. In another example, if a user desires to modify an announcement being played by a gateway, the user accesses the previously-created package definition, makes the desired modifications, and exports the new package to the gateway. A new package definition corresponding to the package is stored in database 400. Thus, by creating and storing package definitions in database 400, the present invention greatly facilitates the provisioning of audio on gateways.

The present invention provides novel methods and systems for provisioning frequently-accessed announcements to network elements connected to end users. Because end users can access announcements without establishing a network connection with an audio server, network congestion and workload is reduced. In addition, exporting audio packages from a provisioning server using a convenient graphical interface reduces the time required to provision gateways and increases the accuracy of the provisioning operation.

It will be understood that various details of the invention can be changed without departing from the scope of the invention. Furthermore, the foregoing description is for the purpose of illustration only, and not for the purpose of limitation—the invention being defined by the claims.

What is claimed is:

1. A system for use in a telecommunications network for providing audio segments to a gateway to be played to an end user of the telecommunications network, said system comprising:
   a provisioning server;
   a centralized database containing a plurality of audio segments, said audio segments comprising announcements to be played to the end user of the telecommunications network;
   an audio package builder/export tool executed by the provisioning server and configured to:
   access the centralized database;
   construct an audio package from audio segments in the centralized database;
   construct an index file within the audio package that indicates to the gateway where an audio segment is located in the audio package; and
   export the audio package to the gateway,
   wherein the audio segment is located by using said index file by mapping the audio identifier of an audio segment in the centralized database to the offset and length of an audio segment within the constructed audio package.

2. The system of claim 1 wherein said audio package builder/export tool is further configured to:
   construct a catalog file within the audio package, said catalog file comprising information selected from the group consisting of: announcement title, phrasing, prompt text, voice talent, language, codec, format, group, release notes, checkdata, and date recorded.

3. The system of claim 1 wherein said audio package builder/export tool exports the audio package to the gateway over a packet based network.

4. The system of claim 1 wherein said system is configured to operate on the provisioning server.

5. The system of claim 1 wherein each of said audio segments comprises a unique audio identifier.

6. The system of claim 1 wherein said audio package builder/export tool is further configured to present a graphical user interface to a user such that the user selects audio segments to be placed in the audio package.

7. The system of claim 1 wherein the audio package further includes an audio segments file comprising a subset of the audio segments in the centralized database.

8. The system of claim 1 wherein said audio package builder/export tool is further configured to export the audio package to the gateway by preliminarily exporting the audio package to an intermediary storage location within the provisioning server.

9. The system of claim 1 wherein said audio package builder/export tool is further configured to export the audio package to the gateway by exporting the audio package to a portable computer readable storage medium.

10. The system of claim 1 wherein said audio package builder/export tool exports the audio package to the gateway so that the gateway selectively presents the audio segments within the audio package to end users.

11. The system of claim 1 wherein said audio package builder/export tool constructs the index file as a distinct data structure within the audio package.

12. A system for use in a telecommunications network for providing audio segments to a gateway to be played to an end user of the telecommunications network, said system comprising:

a provisioning server;

a centralized database containing a plurality of audio segments, said audio segments comprising announcements to be played to the end user of the telecommunications network;

an audio package builder/export tool executed by the provisioning server and configured to:
  access the centralized database;
  construct an audio package from audio segments in the centralized database;
  construct an index file within the audio package that indicates to the gateway where an audio segment is located in the audio package; and
  export the audio package to the gateway,
  wherein the constructed audio package is associated with a version number and said audio package builder/export tool is further configured to track a version number of any audio package created with the audio package builder/export tool.

13. A method of providing audio segments to a gateway to be played to an end user of a telecommunications network, said method comprising:
  accessing audio segments within a centralized database;
  constructing an audio package from the accessed audio segments in the centralized database;
  constructing an index file within the audio package that indicates to the gateway where in the audio package an audio segment is located; and
  exporting the audio package to the gateway, wherein the audio segment is located by using said index file for mapping the audio identifier of an audio segment in the centralized database to the offset and length of the located audio segment within the audio package.

14. The method of claim 13 further comprising provisioning the centralized database with audio segments.

15. The method of claim 13 further comprising constructing a catalog file within the audio package, said catalog file comprising information selected from the group consisting of: announcement title, phrasing, prompt text, voice talent, language, codec, format, group, release notes, checkdata, and date recorded.

16. The method of claim 13 wherein exporting the audio package to the gateway comprises exporting the audio package over a packet based network.

17. The method of claim 13 further comprising associating each of said audio segments with an unique audio identifier.

18. The method of claim 13 further comprising presenting a graphical user interface to a user such that the user selects audio segments to be placed in the audio package.

19. The method of claim 13 wherein the audio package is constructed from a subset of the audio segments in the centralized database.

20. The method of claim 13 wherein exporting the audio package to the gateway comprises exporting the audio package to an intermediary storage location within a provisioning server.

21. The method of claim 13 wherein exporting the audio package to the gateway comprises exporting the audio package to a portable computer readable storage medium.

22. A method of providing audio segments to a gateway to be played to an end user of a telecommunications network, said method comprising:
  accessing audio segments within a centralized database;
  constructing an audio package from audio segments in the centralized database;
  constructing an index file within the audio package that indicates to the gateway where in the audio package an audio segment is located;
  exporting the audio package to the gateway,
  wherein the constructed audio package is associated with a version number and each audio package constructed is tracked by its own version number.

* * * * *